US012754365B2

(12) United States Patent
Nakanishi et al.

(10) Patent No.: US 12,754,365 B2
(45) Date of Patent: Oct. 6, 2026

(54) OPTICAL WAVEGUIDE PRODUCTION METHOD AND OPTICAL WAVEGUIDE

(71) Applicant: SUMITOMO ELECTRIC INDUSTRIES, LTD., Osaka (JP)

(72) Inventors: Tetsuya Nakanishi, Osaka (JP); Manabu Shiozaki, Osaka (JP); Shigehiro Nagano, Osaka (JP); Hajime Arao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 392 days.

(21) Appl. No.: 18/281,788

(22) PCT Filed: May 27, 2022

(86) PCT No.: PCT/JP2022/021776
§ 371 (c)(1),
(2) Date: Sep. 13, 2023

(87) PCT Pub. No.: WO2022/255261
PCT Pub. Date: Dec. 9, 2022

(65) Prior Publication Data

US 2024/0168222 A1 May 23, 2024

(30) Foreign Application Priority Data

May 31, 2021 (JP) ................................ 2021-091826

(51) Int. Cl.
*G02B 6/12* (2006.01)
*G02B 6/13* (2006.01)

(52) U.S. Cl.
CPC ........... *G02B 6/12007* (2013.01); *G02B 6/13* (2013.01); *G02B 6/12002* (2013.01); *G02B 2006/12171* (2013.01)

(58) Field of Classification Search
CPC .. G02B 6/12002; G02B 6/12007; G02B 6/13; G02B 2006/12171
See application file for complete search history.

(56) References Cited

U.S. PATENT DOCUMENTS 5,066,133 A * 11/1991 Brienza .............. G02B 6/02133 359/566
6,104,852 A * 8/2000 Kashyap ................ G02B 6/021 385/37
6,573,026 B1 * 6/2003 Aitken ................... G11C 13/04 430/290

(Continued)

FOREIGN PATENT DOCUMENTS

JP H04-21532 A 1/1992
JP 9-311238 A 12/1997

(Continued)

OTHER PUBLICATIONS

Davis et al., "Writing Waveguides in Glass with a Femtosecond Laser," Optics Letters, Nov. 1, 1996, vol. 21, No. 21, pp. 1729-1731.
Nasu et al., "Low-Loss Waveguides Written with a Femtosecond Laser for Flexible Interconnection in a Planar Light-Wave Circuit," Optics Letters, Apr. 1, 2005, vol. 30, No. 7, pp. 723-725.

*Primary Examiner* — Daniel Petkovsek
(74) *Attorney, Agent, or Firm* — Oliff PLC

(57) ABSTRACT

An optical waveguide manufacturing method according to one embodiment is an optical waveguide manufacturing method by irradiating glass with femtosecond laser beam to form an optical waveguide. The optical waveguide manufacturing method includes a first process of irradiating the glass with the femtosecond laser beam having a pulse width of 300 (fs) or less and a repetition frequency of 700 (kHz) or less while relatively moving the glass and a focal position of the femtosecond laser beam and a second process of irradiating an increased refractive index portion with a femtosecond laser beam having a pulse width of 300 (fs) or less and a repetition frequency higher than 700 (kHz).

5 Claims, 13 Drawing Sheets

(56) References Cited

U.S. PATENT DOCUMENTS

| | | | | |
|---|---|---|---|---|
| 6,950,591 | B2 * | 9/2005 | Schroeder | C03C 23/0025 385/132 |
| 7,294,454 | B1 * | 11/2007 | Said | G02B 6/13 219/121.85 |
| 10,698,292 | B1 * | 6/2020 | Nagano | G02F 1/3555 |
| 2001/0021293 | A1 | 9/2001 | Kouta et al. | |
| 2002/0162360 | A1 | 11/2002 | Schaffer et al. | |
| 2003/0035640 | A1 | 2/2003 | Dugan et al. | |
| 2003/0099452 | A1 * | 5/2003 | Borrelli | G02B 6/13 430/290 |
| 2004/0037526 | A1 | 2/2004 | Campion et al. | |
| 2007/0154143 | A1 * | 7/2007 | Mihailov | G02B 6/02114 385/37 |
| 2021/0080650 | A1 * | 3/2021 | Nagano | C03C 21/007 |
| 2021/0181412 | A1 | 6/2021 | Tsuchizawa et al. | |

FOREIGN PATENT DOCUMENTS

| | | | |
|---|---|---|---|
| JP | 2000-249859 | A | 9/2000 |
| JP | 2000-256029 | A | 9/2000 |
| JP | 2001-311847 | A | 11/2001 |
| JP | 2001-324634 | A | 11/2001 |
| JP | 2002-098848 | A | 4/2002 |
| JP | 2002-148450 | A | 5/2002 |
| JP | 2003-215376 | A | 7/2003 |
| JP | 2004-138680 | A | 5/2004 |
| JP | 2004-341125 | A | 12/2004 |
| JP | 2005-221530 | A | 8/2005 |
| JP | 2005-257719 | A | 9/2005 |
| JP | 2005-338502 | A | 12/2005 |
| JP | 2014-031303 | A | 2/2014 |
| JP | 2019-203915 | A | 11/2019 |

* cited by examiner

OPTICAL WAVEGUIDE PRODUCTION METHOD AND OPTICAL WAVEGUIDE

TECHNICAL FIELD

The present disclosure relates to an optical waveguide manufacturing method and an optical waveguide.

BACKGROUND ART

Non Patent Literature 1 describes a technique for irradiating glass with a femtosecond laser beam with a wavelength of 810 nm. By irradiating the glass with the femtosecond laser beam, an increased refractive index portion having a circular cross section is formed inside the glass. This increased refractive index portion functions as an optical waveguide formed inside the glass. Non Patent Literature 2 describes that a transmission loss of light of 0.35 (dB/cm) occurs in an optical waveguide formed by a femtosecond laser beam.

CITATION LIST

Non Patent Literature

Non Patent Literature 1: K. M. Davis, K. Miura, N. Sugimoto, and K. Hirao, “Writing waveguides in glass with a femtosecond laser,” OPTIC LETTERS, vol.21, No.21, pp1729-1731 (Nov. 1, 1996)

Non Patent Literature 2: Yusuke Nasu, Masaki Kohtoku, and Yoshinori Hibino, “Low-loss waveguides written with a femtosecond laser for flexible interconnection in a planar light-wave circuit,” Optic Letters 30, no. 7 (2005)

SUMMARY OF INVENTION

An optical waveguide manufacturing method according to the present disclosure is a method for manufacturing an optical waveguide by irradiating glass with a femtosecond laser beam to form the optical waveguide. The optical waveguide manufacturing method includes a first process of irradiating the glass with a femtosecond laser beam having a pulse width of 300 (fs) or less and a repetition frequency of 700 (kHz) or less while relatively moving the glass and a focal position of the femtosecond laser beam and a second process of irradiating an increased refractive index portion with the femtosecond laser beam having a pulse width of 300 (fs) or less and a repetition frequency higher than 700 (kHz).

An optical waveguide according to the present disclosure is an optical waveguide having a changed refractive index portion which is a portion where a density of glass changes in a substrate configured with the glass having a uniform composition and the changed refractive index portion is extended in the substrate. The changed refractive index portion includes a waveguide portion having a cross-sectional area S with a refractive index larger than that of the substrate by 0.01% or more of the refractive index of the substrate, and the sum of the standard deviation σR in the longitudinal direction, which is the direction in which the changed refractive index portion of $(S/\pi)^{1/2}$ is extended and the standard deviation σG in the longitudinal direction of barycentric coordinates G(D2, D1) given by Equation (1) (Formula 1) satisfies σ≤0.12 μm.

[Formula 1]

$$G=\left(\frac{\sum_{i=1}^{n}\sum_{j=1}^{m}(D2ij\cdot\Delta_{D2ij})}{\sum_{i=1}^{n}\sum_{j=1}^{m}(\Delta_{D2ij})},\ \frac{\sum_{i=1}^{n}\sum_{j=1}^{m}(D1ij\cdot\Delta_{D1ij})}{\sum_{i=1}^{n}\sum_{j=1}^{m}(\Delta_{D1ij})}\right)\quad(1)$$

Another optical waveguide according to the present disclosure is an optical waveguide having a changed refractive index portion which is a portion where a density of glass changes in a substrate configured with the glass having a uniform composition and the changed refractive index portion is extended in the substrate. The changed refractive index portion includes a waveguide portion having a cross-sectional area S with a refractive index larger than that of the substrate by 0.01% or more of the refractive index of the substrate. The sum σ of the standard deviation σR in the longitudinal direction, which is the direction in which the changed refractive index portion of $(S/\pi)^{1/2}$ is extended and the standard deviation σG in the longitudinal direction of barycentric coordinates G(D2, D1) given by Equation (1) (Formula 1) and the standard deviation σΔ in a longitudinal direction of an average value Δ in a cross section perpendicular to the longitudinal direction of the relative refractive index difference of the waveguide portion satisfies Formula 2.

[Formula 1]

$$G=\left(\frac{\sum_{i=1}^{n}\sum_{j=1}^{m}(D2ij\cdot\Delta_{D2ij})}{\sum_{i=1}^{n}\sum_{j=1}^{m}(\Delta_{D2ij})},\ \frac{\sum_{i=1}^{n}\sum_{j=1}^{m}(D1ij\cdot\Delta_{D1ij})}{\sum_{i=1}^{n}\sum_{j=1}^{m}(\Delta_{D1ij})}\right)\quad(1)$$

$$0.1\times\left((\sigma/0.13745)^2+(\sigma\,\Delta/0.00677)^2\right)<0.1[\text{dB/cm}]\quad\text{[Formula 2]}$$

In still another aspect, the standard deviation σw of the roughness of the inner wall surface of the hole formed by dissolving the waveguide portion with acid or alkali is 0.12 μm or less.

DESCRIPTION OF EMBODIMENTS

Figure 1:
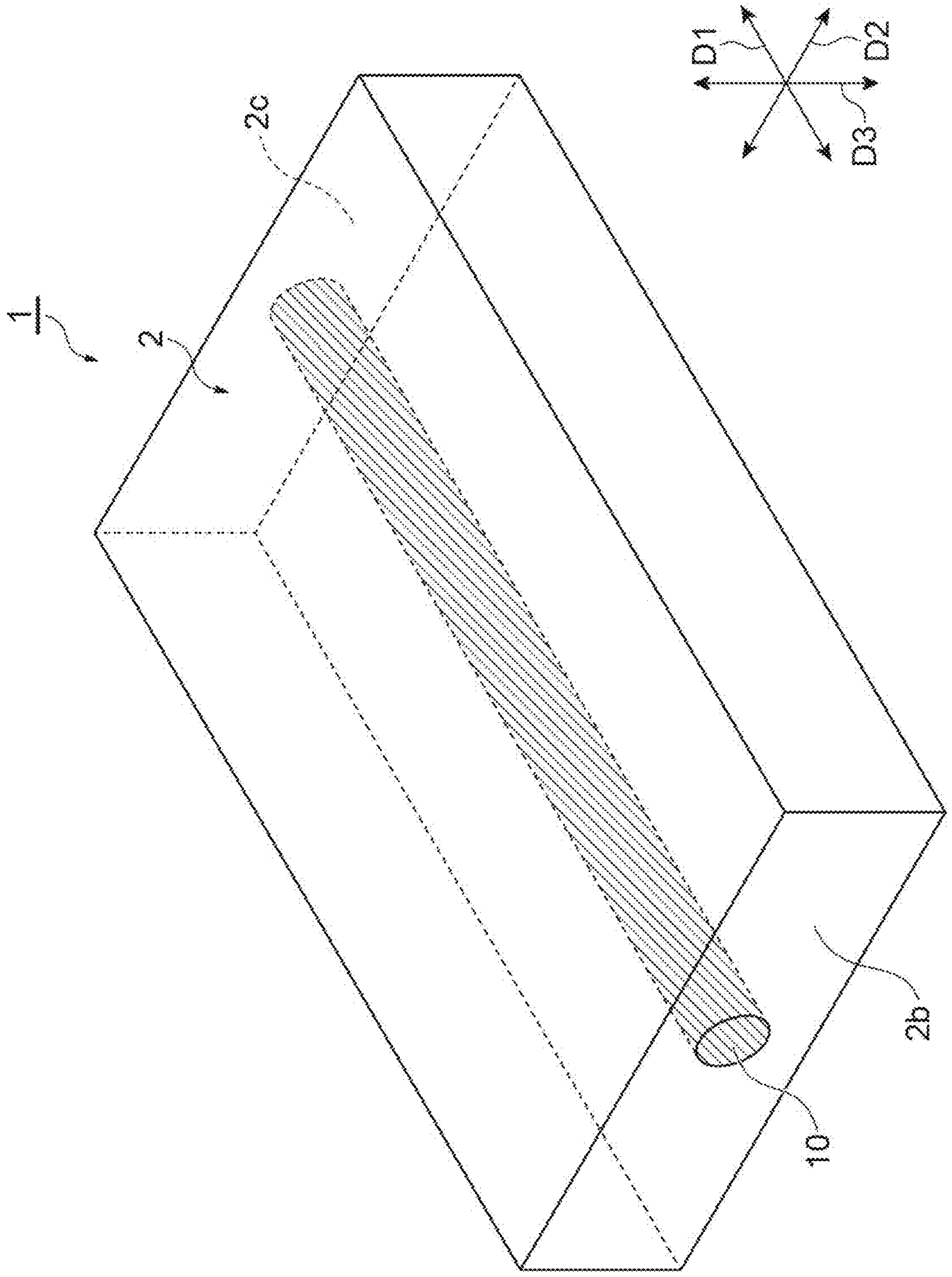
FIG. 1 is a perspective view schematically illustrating an optical waveguide according to an embodiment.

In some cases, in an optical waveguide formed by irradiating glass with a femtosecond laser beam, refractive index may fluctuate inside an increased refractive index portion. When the refractive index fluctuates significantly inside the increased refractive index portion, a transmission loss of light in the optical waveguide increases. In the optical waveguide formed by the irradiation with the femtosecond laser, it is required to reduce the transmission loss of light.

An object of the present disclosure is to provide an optical waveguide manufacturing method and an optical waveguide capable of reducing the transmission loss of light.

Description of Embodiments of Present Disclosure

First, embodiments of the present disclosure will be listed and explained. An optical waveguide manufacturing method according to the embodiment is the method for manufacturing an optical waveguide by irradiating glass with the femtosecond laser beam to form the optical waveguide. The optical waveguide manufacturing method includes a first process of irradiating the glass with the femtosecond laser beam having a pulse width of 300 (fs) or less and a repetition frequency of 700 (kHz) or less while relatively moving the glass and a focal position of the femtosecond laser beam and a second process of irradiating an increased refractive index portion with a femtosecond laser beam having a pulse width of 300 (fs) or less and a repetition frequency higher than 700 (kHz).

In this optical waveguide manufacturing method, since the glass is irradiated with the pulsed femtosecond laser beam having a high peak energy in the first process, a change in density of the glass occurs due to the femtosecond laser beam, and thus, a portion where the change in density occurs can be used as the increased refractive index portion. In the second process, since the increased refractive index portion is irradiated with the femtosecond laser beam having a repetition frequency higher than 700 (kHz), the energy of the femtosecond laser beam in the increased refractive index portion is converted into heat, so that the fluctuation in refractive index is alleviated. In this disclosure, "the fluctuation in refractive index is alleviated" indicates the reduction of the change in refractive index (variation in refractive index) in a certain area. By alleviating the fluctuation in refractive index, the transmission loss of light in the increased refractive index portion functioning as the optical waveguide can be reduced. For example, the transmission loss of light in the optical waveguide can be reduced to 0.1 (dB/cm) or less.

The pulse peak energy E1 of the femtosecond laser beam irradiated in the first process and the pulse peak energy E2 of the femtosecond laser beam irradiated in the second process may satisfy E1>E2 and E2> (E1/100). In this case, since the pulse peak energy E2 of the femtosecond laser beam in the second process is smaller than the pulse peak energy E1 of the femtosecond laser beam in the first process, damage to the glass can be suppressed. When E2 is larger than (E1/100), the fluctuation in refractive index in the increased refractive index portion can be alleviated.

The distance (depth) from the incident position of the femtosecond laser beam on the glass to the focal position in the second process may be larger (deeper) than the distance (depth) from the incident position of the femtosecond laser beam on the glass to the focal position in the first process. When the femtosecond laser beam is irradiated in the first process, the increased refractive index portion is formed at a position farther from the front surface of the substrate than the focal position of the femtosecond laser beam. Therefore, when the depth of the focal position of the femtosecond laser beam in the second process is deeper than the depth of the focal position of the femtosecond laser beam in the first process, the focal position of the femtosecond laser beam in the second process can be brought close to the increased refractive index portion.

In the optical waveguide manufacturing method, in the first process, the glass may be irradiated with the femtosecond laser beam at a plurality of spatial periods different from each other to form the increased refractive index portion.

An optical waveguide according to the embodiment is an optical waveguide having a changed refractive index portion, which is a portion where a density of glass changes in a substrate configured with the glass having a uniform composition, and the changed refractive index portion is extended in the substrate. The changed refractive index portion includes a waveguide portion having a cross-sectional area S with a refractive index larger than that of the substrate by 0.01% or more of the refractive index of the substrate, and the sum $\sigma$ of a standard deviation $\sigma R$ in a longitudinal direction, which is a direction in which the changed refractive index portion of $(S/\pi)^{1/2}$ is extended and the standard deviation $\sigma G$ in the longitudinal direction of barycentric coordinates G(D2, D1) given by Equation (1) (Formula 1) satisfies $\sigma \leq 0.12$ μm.

[Formula 1]

$$G = \left( \frac{\sum_{i=1}^{n} \sum_{j=1}^{m} (D2ij \cdot \Delta_{D2ij})}{\sum_{i=1}^{n} \sum_{j=1}^{m} (\Delta_{D2ij})}, \frac{\sum_{i=1}^{n} \sum_{j=1}^{m} (D1ij \cdot \Delta_{D1ij})}{\sum_{i=1}^{n} \sum_{j=1}^{m} (\Delta_{D1ij})} \right) \quad (1)$$

In the present disclosure, the term "uniform composition" indicates that components constituting a certain thing are substantially uniformly dispersed. "Substantially uniform" denotes generally uniform, and also includes a non-uniform state as long as the function and effect do not change. The changed refractive index portion can be formed by changing a density of the glass by irradiating the substrate with the femtosecond laser. The amount of change σ (μm) of the radius of the cross section of the changed refractive index portion in the longitudinal direction is 0.12 or less, so that the transmission loss of light propagating through the changed refractive index portion can be reduced to 0.1 (dB/cm) or less. The changed refractive index portion has a waveguide portion. The "waveguide portion" indicates a portion of which refractive index is larger than that of the substrate by 0.01% or more of the refractive index of the substrate.

Another optical waveguide according to the embodiment is an optical waveguide having a changed refractive index portion which is a portion where a density of the glass changes in the substrate configured with glass having a uniform composition and the changed refractive index portion is extended in the substrate. The changed refractive index portion includes the waveguide portion having a cross-sectional area S with a refractive index larger than that of the substrate by 0.01% or more of the refractive index of the substrate, and the sum σ of the standard deviation σR in the longitudinal direction, which is the direction in which the changed refractive index portion of $(S/\pi)^{1/2}$ is extended and the standard deviation σG in the longitudinal direction of barycentric coordinates G(D2, D1) given by Equation (1) (Formula 1) and the standard deviation σΔ in a longitudinal direction of an average value Δ in a cross section perpendicular to the longitudinal direction of the relative refractive index difference of the waveguide portion satisfies Formula 2.

[Formula 1]

$$G = \left( \frac{\sum_{i=1}^{n} \sum_{j=1}^{m} (D2ij \cdot \Delta_{D2ij})}{\sum_{i=1}^{n} \sum_{j=1}^{m} (\Delta_{D2ij})}, \frac{\sum_{i=1}^{n} \sum_{j=1}^{m} (D1ij \cdot \Delta_{D1ij})}{\sum_{i=1}^{n} \sum_{j=1}^{m} (\Delta_{D1ij})} \right) \quad (1)$$

$$0.1 \times \left( (\sigma/0.13745)^2 + (\sigma\,\Delta/0.00677)^2 \right) < 0.1 [\text{dB/cm}] \quad \text{[Formula 2]}$$

In the changed refractive index portion of this optical waveguide, the relationship between the sum σ of the standard deviation σG in the longitudinal direction of barycentric coordinates G(D2, D1) of the waveguide portion and the standard deviation σΔ in a longitudinal direction of a relative refractive index difference Δ of the changed refractive index portion satisfies Formula 2. In this case, the transmission loss of light propagating through the changed refractive index portion can be reduced to 0.1 (dB/cm) or less.

$$0.1 \times \left( (\sigma/0.13745)^2 + (\sigma\,\Delta/0.00677)^2 \right) < 0.1 [\text{dB/cm}] \quad \text{[Formula 2]}$$

A Numerical aperture NA may be 0.1 or more and 0.15 or less, and the transmission loss of light having a wavelength of 1310 (nm) may be 0.1 (dB/cm) or less. In this case, since the numerical aperture NA is 0.1 or more, light can be confined in the changed refractive index portion in a communication wavelength band, so that the optical waveguide having a curved shape can be produced. When the numerical aperture NA is 0.15 or less, transmission in the single mode can be realized at a wavelength of 1310 nm, and the scattering loss of light propagating through the changed refractive index portion is reduced to reduce the transmission loss of light to 0.1 (dB/cm) or less.

The optical waveguide may have the increased refractive index portion having the higher refractive index than the surroundings and the decreased refractive index portion having the lower refractive index than the surroundings and formed between the front surface of the substrate and the increased refractive index portion. The refractive index may decrease from the increased refractive index portion toward the decreased refractive index portion along the direction in which the increased refractive index portion, the decreased refractive index portion, and the front surface are aligned. There may be at least three points of inflection between the maximum refractive index point in the increased refractive index portion and the minimum refractive index point in the decreased refractive index portion. In this case, a portion where the refractive index changes smoothly is formed at the inflection point between the increased refractive index portion and the decreased refractive index portion. Therefore, the portion in which the fluctuation in refractive index is alleviated can be formed.

The changed refractive index portion may have a first area including the center of the cross section of the changed refractive index portion, a second area located radially outside the first area, and a third area located radially outside the second area. When the relative refractive index difference of the changed refractive index portion with respect to the refractive index of the substrate is denoted by Δ, the first area may be a light confining portion having Δ of 0.3% or more. The second area may be an inclined portion having an amount of change in Δ (dΔ/dr) in the radial direction of the cross section of 0.05 (%/μm) or more. The third area may be a diffusion portion having Δ being larger than 0(%) and being 0.1(%) or less. In this case, since Δ of the third area located at the outer edge of the changed refractive index portion is 0.1(%) or less, the propagation of higher-order modes that deteriorate the signal quality of communication can be suppressed.

The change in refractive index in the changed refractive index portion may have two or more different longitudinal periods.

The substrate may be configured with glass containing $SiO_2$ at a mass fraction of 80% or more. In this case, the standard deviation σΔ of the relative refractive index difference Δ of the changed refractive index portion in the longitudinal direction can be made smaller than 0.003 (%). Therefore, the fluctuation in refractive index inside the substrate can be alleviated.

The substrate may be configured with glass containing $SiO_2$ being at a mass fraction of 95% or more.

The substrate may contain OH groups. A mass fraction of OH groups contained in the substrate may be 100 ppm or less. In this case, an absorption loss of light with a wavelength of 1310 (nm) to the substrate can be reduced to 0.01 (dB/cm) or less.

The substrate may contain deuterium. By irradiating the glass to which hydrogen is added with the femtosecond laser beam, the reactivity of the glass is enhanced, and the changed refractive index portion can be easily formed. However, in the case of glass to which hydrogen is added, OH groups remain inside the glass, so that the absorption loss of light may occur. On the other hand, in the case of glass containing deuterium, OD groups remain inside the glass. Since the OD group does not have any large absorption peak in the communication wavelength band of 1310

(nm) to 1625 (nm), the changed refractive index portion can be easily formed, and the absorption loss of light can be suppressed.

The substrate may be configured with $SiO_2$ containing halogen with a concentration at a mass fraction of 0.5% or more. The glass to which halogen is added at a mass fraction of 0.5% or more can suppress the increase in the concentration of OH groups inside the glass. As a type of halogen, Cl (chlorine), F (fluorine), or the like can be appropriately selected.

Details of Embodiments of Present Disclosure

A specific example of an optical waveguide manufacturing method and the optical waveguide according to the embodiment will be described below with reference to the drawings. It is noted that the present invention is not limited to the following examples, but is intended to be indicated in the scope of claims and to include all modifications within the scope of equivalents to the scope of claims. In the description of the drawings, the same or corresponding elements are denoted by the same reference numerals, and overlapping descriptions are omitted as appropriate. In addition, the drawings may be simplified or exaggerated for easier understanding, and the dimensional ratios and the like are not limited to those described in the drawings.

FIG. 1 is a perspective view schematically illustrating an optical waveguide 1 according to the embodiment. The optical waveguide 1 has a substrate 2 configured with glass and a changed refractive index portion 10 formed inside the substrate 2. In the optical waveguide 1, the changed refractive index portion 10 corresponds to a portion through which light propagates. The substrate 2 extends, for example, in a first direction D1 and a second direction D2 intersecting the first direction D1. The substrate 2 has a thickness in a third direction D3 intersecting both the first direction D1 and the second direction D2. As an example, the first direction D1 is a longitudinal direction of the substrate 2. The first direction D1, the second direction D2 and the third direction D3 are, for example, perpendicular to each other.

The substrate 2 is configured with glass having a uniform composition. The substrate 2 exhibits a rectangular plate shape as an example. The substrate 2 has, for example, a first surface 2*b* where the end surface of the changed refractive index portion 10 is exposed and a second surface 2*c* facing away from the first surface 2*b*. For example, the substrate 2 is configured with glass containing $SiO_2$ at a mass fraction of 80% or more. Further, the substrate 2 may be configured with glass containing $SiO_2$ at a mass fraction of 95% or more.

The substrate 2 contains OH groups. For example, a mass fraction (concentration) of OH groups contained in the substrate 2 is 100 ppm or less. The substrate 2 may be configured with $SiO_2$ added with deuterium. Further, the substrate 2 may be configured with $SiO_2$ containing halogen at a mass fraction (concentration) of 0.5% or more. The changed refractive index portion 10 is a portion where the density of the glass in the substrate 2 is changed. The changed refractive index portion 10 extends inside the substrate 2 along the first direction D1. In the embodiment, the first direction D1 corresponds to the longitudinal direction of the changed refractive index portion 10.

Figure 2:
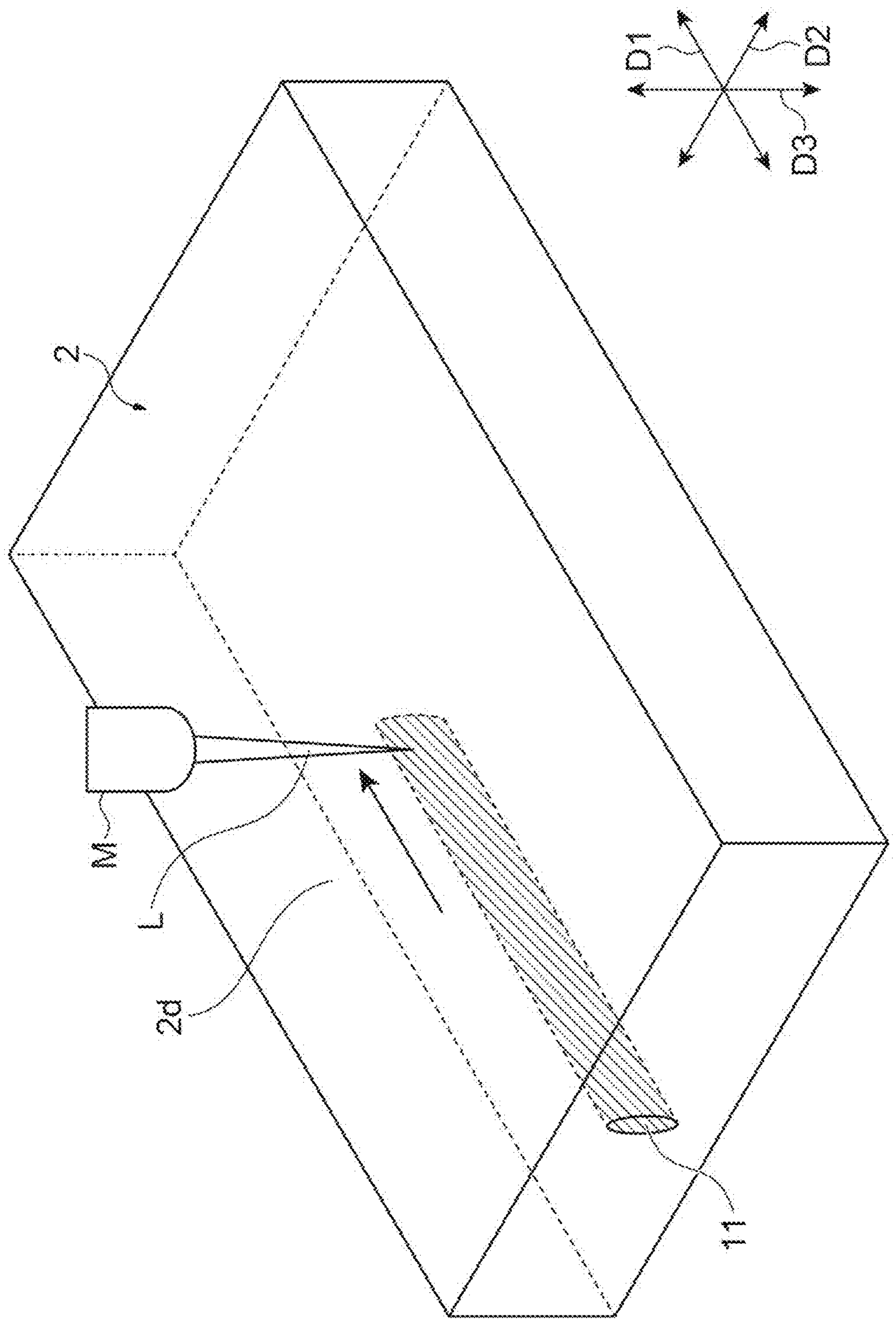
FIG. 2 is a perspective view schematically illustrating a mode of irradiation of a substrate according to the embodiment with a femtosecond laser beam.

Next, a specific example of the method for manufacturing the optical waveguide 1 according to the embodiment will be described. As illustrated in FIG. 2, the glass forming the substrate 2 is irradiated with the femtosecond laser beam L. The method for manufacturing the optical waveguide 1 includes a first process of forming an increased refractive index portion 11 and a second process of alleviating fluctuations in refractive index of the glass of the increased refractive index portion 11. For example, a laser medium of femtosecond laser beam L is a crystal or fiber laser. A wavelength of the femtosecond laser beam L can be appropriately selected by a seed light source or harmonic generation. The wavelength of the femtosecond laser beam L is, for example, 930 nm or 515 nm.

Figure 3:
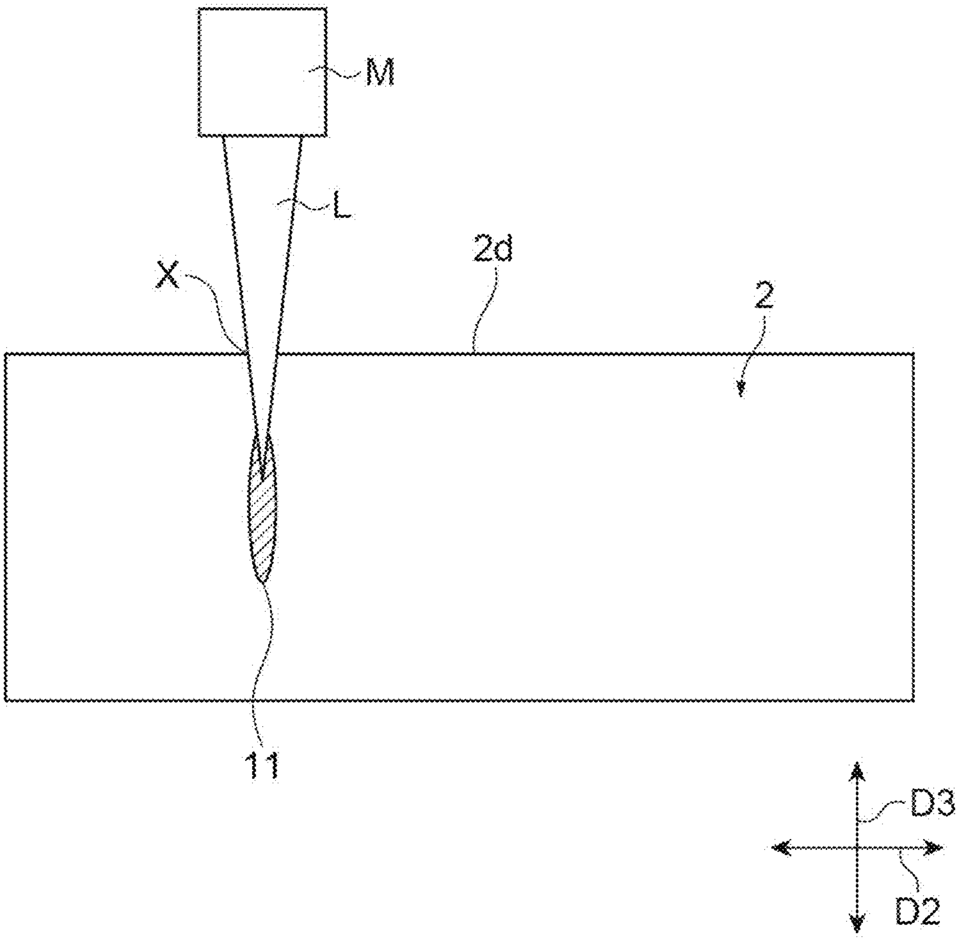
FIG. 3 is a diagram illustrating a mode of irradiation of a plane perpendicular to a longitudinal direction with a femtosecond laser beam.

FIG. 2 is a perspective view illustrating irradiation of the substrate 2 with the femtosecond laser beam L in the first process. FIG. 3 is a cross-sectional view illustrating irradiation of the substrate 2 with the femtosecond laser beam L in the first process. As illustrated in FIGS. 2 and 3, in the first process, the substrate 2 is irradiated with the femtosecond laser beam L while an irradiation device M for irradiating the femtosecond laser beam L is moved along the first direction D1. The speed of movement (scanning speed) may be, for example, 2 mm/s, may be 0.01 mm/s or more, and may be 100 mm/s or less. A pulse width of the femtosecond laser beam L in the first process is 300 (fs) or less. A repetition frequency of the femtosecond laser beam L in the first process is 700 (kHz) or less. It is noted that, from the practical point of view, the lower limit of the pulse width of the femtosecond laser beam L in the first process is 3 (fs). The lower limit of the repetition frequency of the femtosecond laser beam L in the first process is 1 (kHz).

The substrate 2 has a front surface 2*d* extending in the first direction D1 and the second direction D2, and for example, the irradiation device M irradiates the front surface 2*d* with the femtosecond laser beam L. The femtosecond laser beam L is emitted from the irradiation device M to the substrate 2 along the third direction D3. By irradiating with the femtosecond laser beam L while moving the irradiation device M along the first direction D1, the increased refractive index portion 11 extending in the first direction D1 is formed inside the substrate 2. A cross-section of the increased refractive index portion 11 in the plane perpendicular to the first direction D1 has, for example, an elliptical shape having a major axis in the third direction D3.

Figure 4:
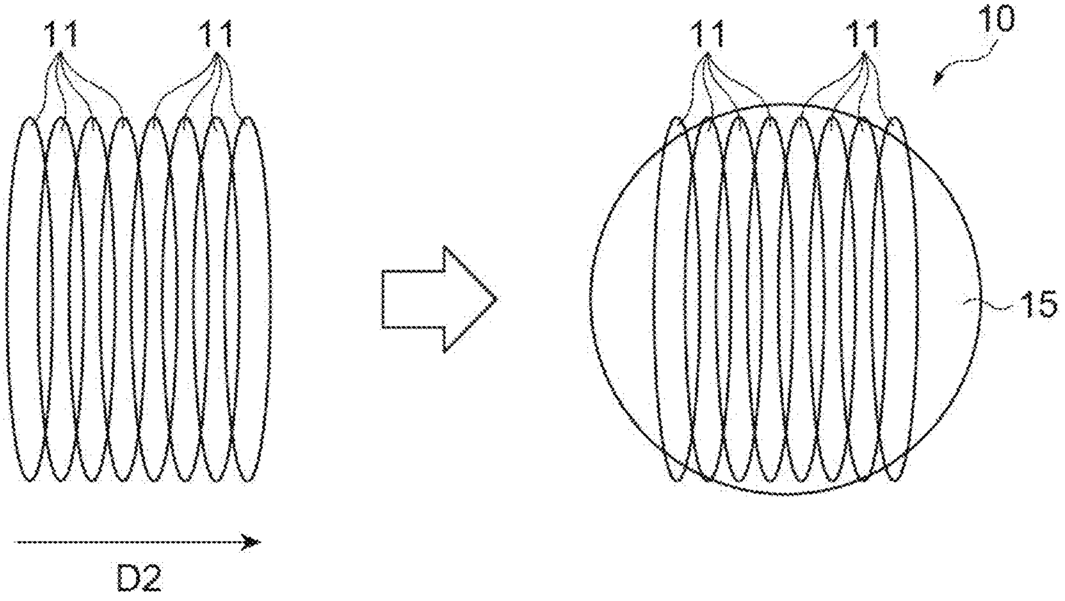
FIG. 4 is a diagram schematically illustrating each of a first process and a second process according to the embodiment.

FIG. 4 is a diagram describing the formation of the increased refractive index portion 11 in the first process and the alleviation of the fluctuation in refractive index in the second process. As illustrated in FIG. 4, in the first process, the plurality of increased refractive index portions 11 are formed while shifting their positions in the second direction D2. The plurality of increased refractive index portions 11 aligned along the second direction D2 overlap each other. By forming the plurality of increased refractive index portions 11 overlapping each other along the second direction D2 in this manner, the refractive index increases in the area having a rectangular cross section in the first process.

In the second process, the plurality of increased refractive index portions 11 formed in the first process is irradiated with the femtosecond laser beam L. The pulse width of the femtosecond laser beam L in the second process is 300 (fs) or less. The repetition frequency of the femtosecond laser beam L in the second process is higher than 700 (kHz). The pulse width of the femtosecond laser beam L in the second process is, for example, the same as the pulse width of the femtosecond laser beam L in the first process. In this case, the irradiation with the femtosecond laser beam L in the second process can be easily performed. From the practical point of view, the upper limit of the repetition frequency of the femtosecond laser beam L in the second process is 20 (MHz).

When the pulse peak energy of the femtosecond laser beam L irradiated in the first process is denoted by E1 and the pulse peak energy of the femtosecond laser beam L irradiated in the second process is denoted by E2, E1 is larger than E2. And E2 is larger than (E1/100). It is noted that the pulse peak energy is defined by the maximum energy of each pulse. For example, the pulse peak energy is measured by a waveform of an autocorrelator. The pulse peak energy can also be calculated from a power meter value, the repetition frequency, and the pulse shape. Herein, since power [J/s] is an average energy [J] of one pulse and the repetition frequency [/s], when the repetition frequency and pulse shape are known, the value of the pulse peak energy can be obtained. The magnitude relationship of the energy described above is also satisfied for the magnitude relationship of power.

In the irradiation with the femtosecond laser beam L in the second process, an alleviation portion 15 of the refractive index is formed so as to surround the plurality of increased refractive index portions 11. In the second process, for example, one-time irradiation with the femtosecond laser beam L is performed while the irradiation device M is moved along the first direction D1. The increased refractive index portion 11 is a portion having a higher refractive index than the portion (clad) of the substrate 2 other than the increased refractive index portion 11. The alleviation portion 15 is a portion where the refractive index gradually changes from the increased refractive index portion 11 toward the clad. The changed refractive index portion 10 includes a plurality of the increased refractive index portions 11 and the alleviation portions 15.

The plurality of increased refractive index portions 11 include waveguide portions having a refractive index larger than that of the substrate 2 by 0.01% or more of the refractive index of the substrate. A cross-sectional area of the waveguide portion is denoted by S, and a standard deviation of $(S/\pi)^{1/2}$ in the longitudinal direction is denoted by σR. In addition, barycentric coordinates G(D2, D1) of the waveguide portion are determined as in Equation (1).

[Formula 1]

$$G=\left(\frac{\sum_{i=1}^{n}\sum_{j=1}^{m}(D2ij\cdot\Delta_{D2ij})}{\sum_{i=1}^{n}\sum_{j=1}^{m}(\Delta_{D2ij})},\frac{\sum_{i=1}^{n}\sum_{j=1}^{m}(D1ij\cdot\Delta_{D1ij})}{\sum_{i=1}^{n}\sum_{j=1}^{m}(\Delta_{D1ij})}\right) \tag{1}$$

The sum of the standard deviations σG and σR in the longitudinal directions of barycentric coordinates G(D2, D1) of this waveguide portion satisfies σ≤0.12 μm.

In addition, the standard deviation σw of the roughness of the inner wall surface of the hole formed by dissolving the waveguide portion with acid or alkali is 0.12 μm or less. The above-mentioned "roughness of the inner wall surface" is, for example, the roughness of the inner wall surface of the hole of the waveguide portion formed by dissolving the waveguide portion with the HF aqueous solution or the KOH aqueous solution is obtained by measuring of an atomic force microscope, a stylus profiling system, or the like. When a KOH aqueous solution is used, the roughness of the inner wall surface obtained after being immersed in 10 vol % KOH aqueous solution at 80° C. for 60 minutes is measured. When an HF aqueous solution is used, the roughness of the inner wall surface obtained after being immersed in 1 vol % HF aqueous solution at room temperature for 10 minutes is measured. It is noted that, in comparison to the HF aqueous solution, the KOH aqueous solution is preferable in that the KOH aqueous solution can selectively dissolve and etch the waveguide portion. A low-loss optical waveguide 1 can be obtained by adjusting the laser irradiation conditions or the annealing conditions so that the measured standard deviation σw of the roughness of the inner wall surface is equal to or less than a predetermined value.

Figure 5:
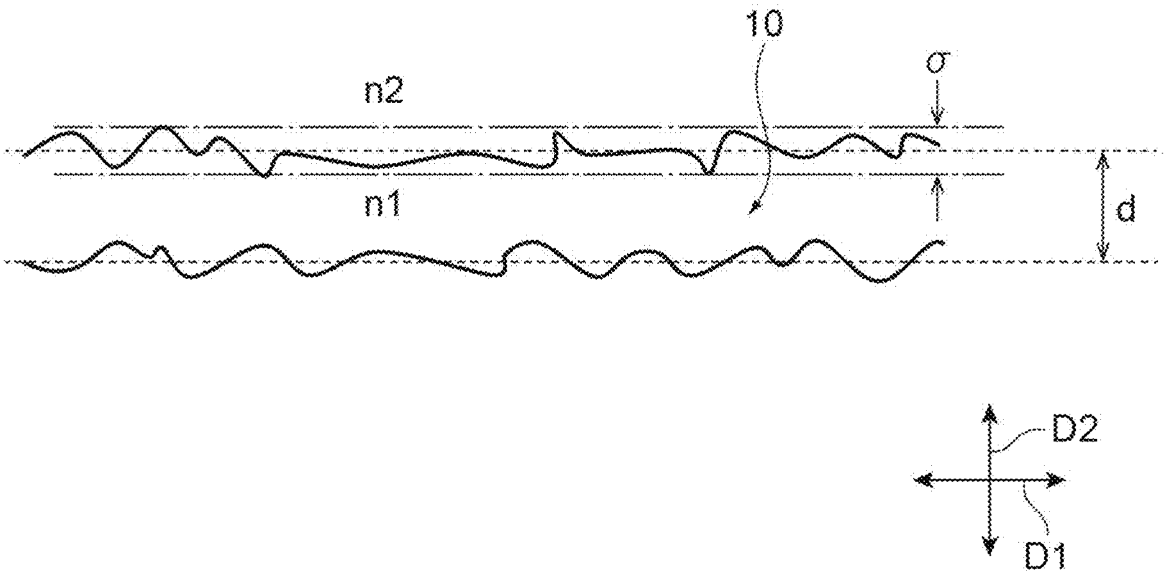
FIG. 5 is a diagram describing a fluctuation in a radius of a changed refractive index portion in the longitudinal direction.
Figure 6:
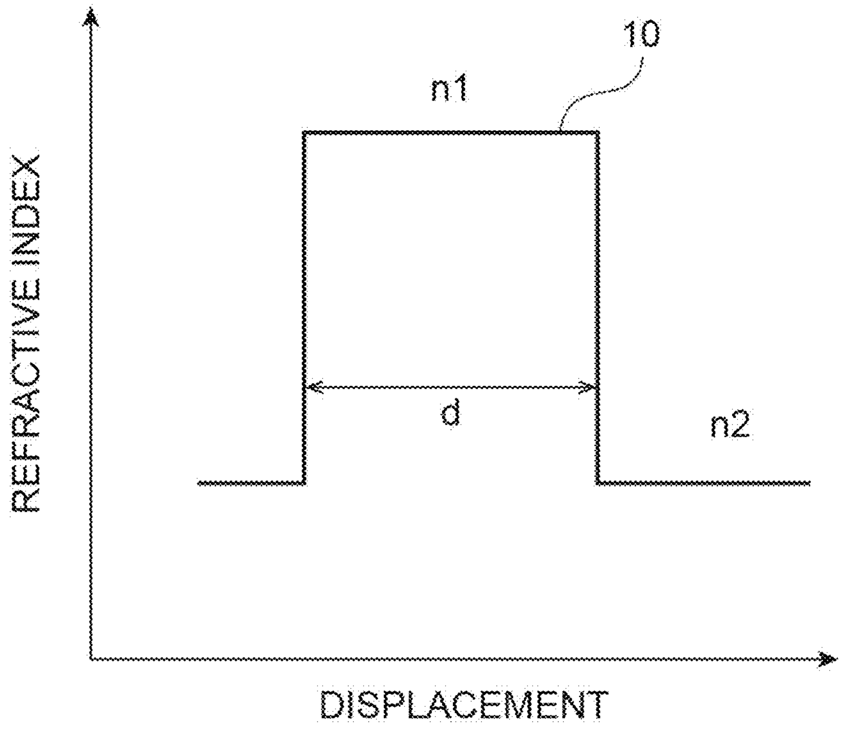
FIG. 6 is a diagram schematically illustrating a width and a refractive index of the changed refractive index portion.

FIG. 5 illustrates the changed refractive index portion 10 viewed along the third direction D3. FIG. 6 is a graph schematically illustrating the refractive index of the changed refractive index portion 10 in the second direction D2. As illustrated in FIG. 6, a refractive index n1 in the changed refractive index portion 10 (increased refractive index portion 11) is higher than a refractive index n2 in the clad of the substrate 2. As illustrated in FIG. 5, a waveguide diameter d of the changed refractive index portion 10 fluctuates depending on the position in the first direction D1. When the amount of change in the radius of the cross section (the cross section in the plane perpendicular to the first direction D1) of the changed refractive index portion 10 in the first direction D1 is denoted by σ, the value of σ is 0.12 μm or less.

Figure 7:
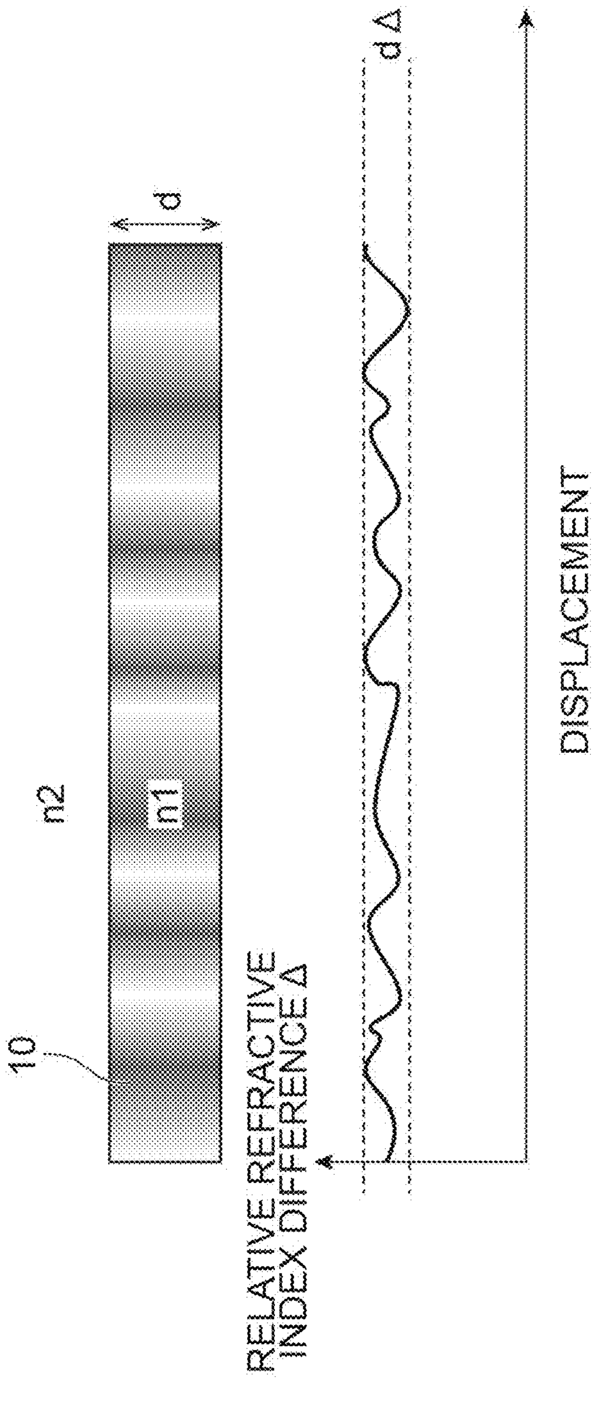
FIG. 7 is a diagram illustrating a relationship between a position of the changed refractive index portion in the longitudinal direction and a relative refractive index difference.

FIG. 7 is a diagram schematically illustrating the refractive index distribution of the changed refractive index portion 10 in the first direction D1. The black and white shading in the upper diagram of FIG. 7 indicates the fluctuation in the refractive index n1 of the changed refractive index portion 10, the black portion indicates a portion with a high refractive index, and a white portion indicates a portion with a low refractive index. The horizontal axis of the lower graph of FIG. 7 indicates the position in the first direction D1, and the vertical axis of the lower graph of FIG. 7 indicates the relative refractive index difference Δ of the changed refractive index portion 10. As illustrated in FIG. 7, the value of the refractive index n1 of the changed refractive index portion 10 fluctuates depending on the position in the first direction D1. The standard deviation σΔ of the relative refractive index difference Δ of the changed refractive index portion 10 in the first direction D1 and the amount of change σ of the radius of the cross section of the changed refractive index portion 10 satisfy the following equation.

$$0.1\times\left((\sigma/0.13745)^2+(\sigma\,\Delta/0.00677)^2\right)<0.1[\text{dB/cm}] \quad \text{[Formula 2]}$$

Figure 8:
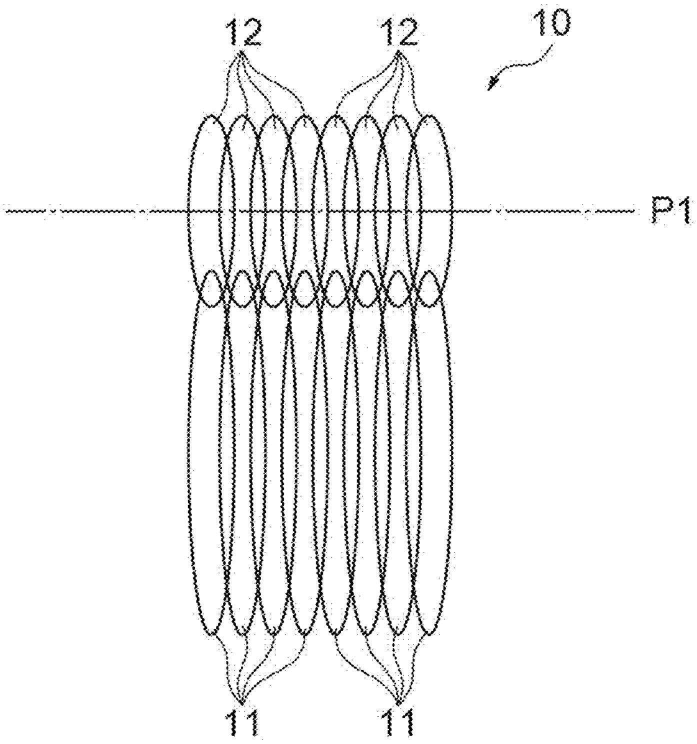
FIG. 8 is a diagram illustrating an increased refractive index portion and a decreased refractive index portion included in a changed refractive index portion.

In the first process described above, the increased refractive index portion 11 and the decreased refractive index portion 12 may be formed by the substrate 2 irradiated with the femtosecond laser beam L. FIG. 8 illustrates the cross section of the increased refractive index portion 11 and the cross section of the decreased refractive index portion 12 in the plane perpendicular to the first direction D1. As illustrated in FIG. 8, the optical waveguide 1 can include the increased refractive index portion 11 having a higher refractive index than the surroundings and the decreased refractive index portion 12 having a lower refractive index than the surroundings. The decreased refractive index portion 12 is formed between the front surface 2*d* of the substrate 2 and the increased refractive index portion 11. The decreased refractive index portion 12 is formed, for example, at a focal position P1 of the femtosecond laser beam L in the first process.

Figure 9:
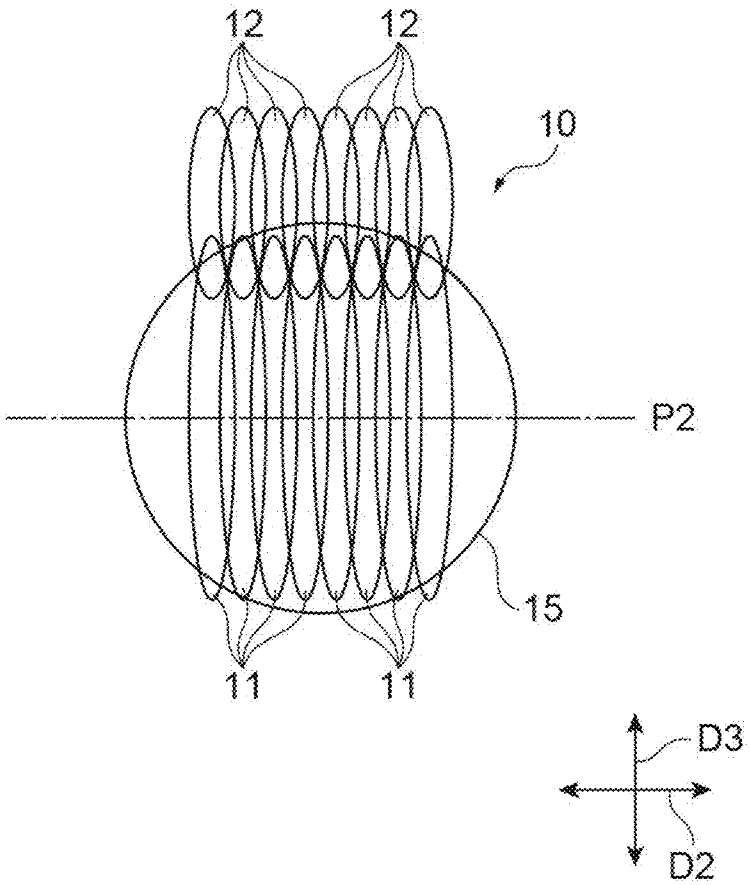
FIG. 9 is a diagram illustrating a mode where the fluctuation in refractive index of the increased refractive index portion is alleviated by the second process.

FIG. 9 illustrates the positional relationship between a focal position P2 of the femtosecond laser beam L, the increased refractive index portion 11, and the decreased refractive index portion 12 in the plane perpendicular to the first direction D1 in the second process. As illustrated in FIGS. 8 and 9, the depth (distance from the incident position X (refer to FIG. 3) which is the intersection of the femtosecond laser beam L and the front surface 2*d*) of the focal position P2 of the femtosecond laser beam L in the second process is deeper than the depth of the focal position P1 of the femtosecond laser beam L in the first process. As a result, in the optical waveguide 1, the alleviation portion 15 is formed so as to surround the plurality of increased refractive index portions 11 located below the plurality of decreased refractive index portions 12 (downstream in the traveling direction of the femtosecond laser beam L).

Figure 10:
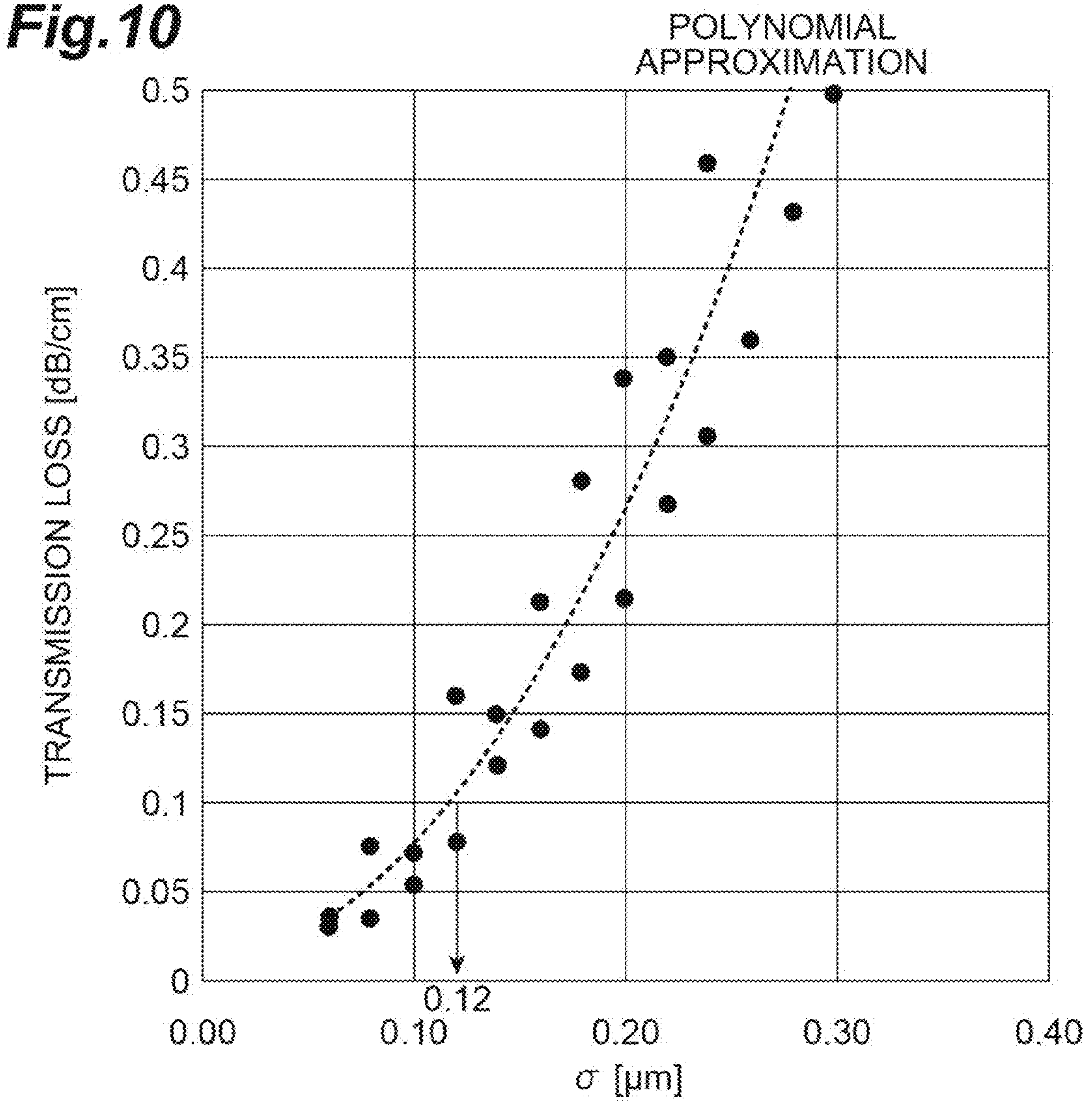
FIG. 10 is a graph illustrating a relationship between an amount of change $\sigma$ of the radius of the cross section of the changed refractive index portion in the longitudinal direction and a transmission loss of light propagating through the changed refractive index portion.

FIG. 10 is a graph illustrating the relationship between the amount of change σ of the radius of the cross section of the changed refractive index portion 10 in a longitudinal direction of an radius of the cross section perpendicular to the first direction D1 and the transmission loss (dB/cm) of light in the changed refractive index portion 10. As illustrated in FIG. 10, the transmission loss value increases as the value of the amount of change σ of the radius of the cross section of the changed refractive index portion 10 increases. As described above, since the value of σ is 0.12 μm or less in this embodiment, the transmission loss can be reduced to 0.1 (dB/cm) or less. When the value of σ is 0.1 or less, the transmission loss can be more reliably reduced to 0.1 (dB/cm) or less.

Figure 11:
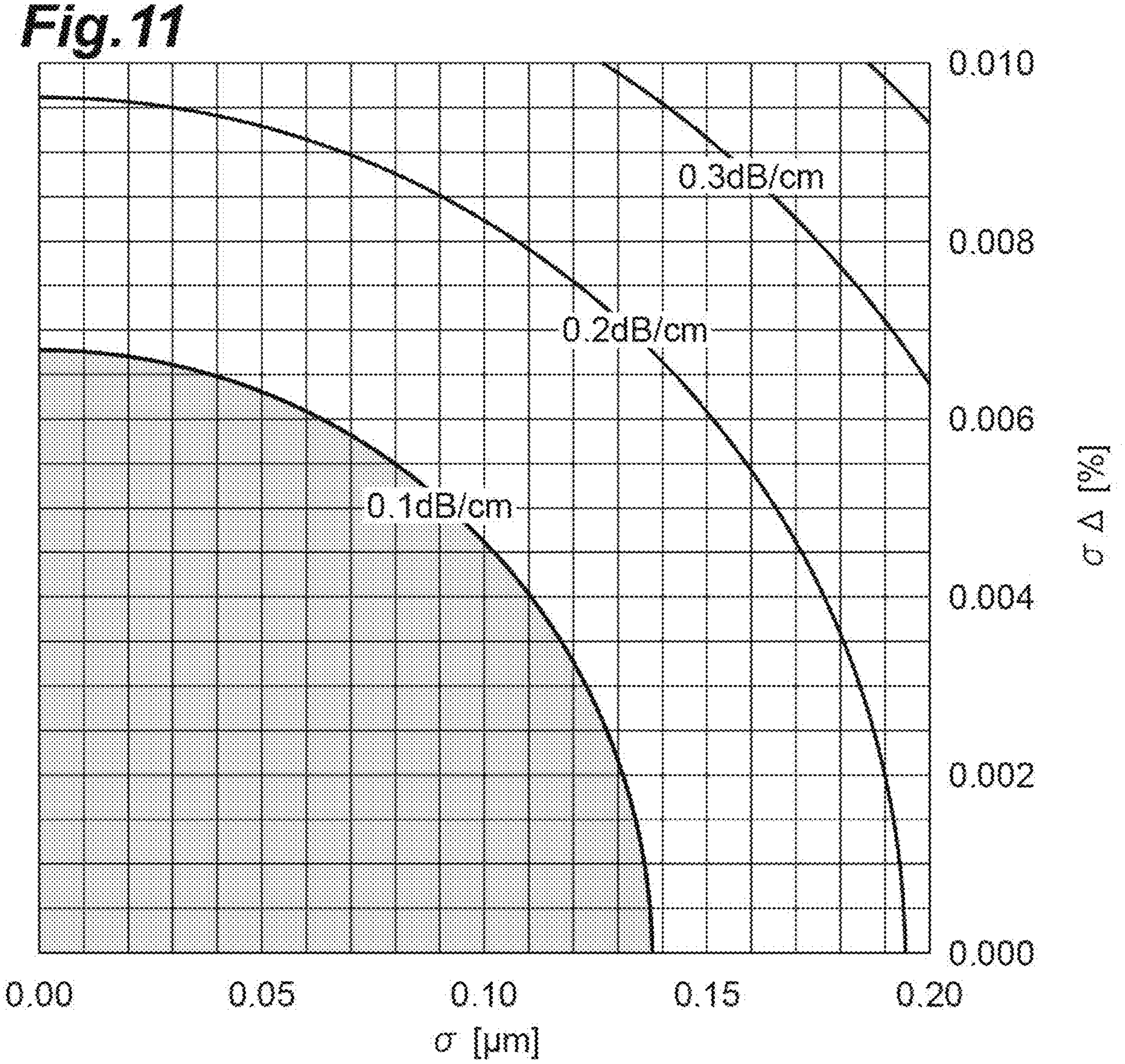
FIG. 11 is a graph illustrating a relationship among the amount of change $\sigma$ of the radius of the cross section of the changed refractive index portion in the longitudinal direction, a standard deviation $\sigma\Delta$ of the relative refractive index difference $\Delta$ of the changed refractive index portion in the longitudinal direction, and the transmission loss of light propagating through the changed refractive index portion.

FIG. 11 is a graph illustrating the relationship between the standard deviations σΔ of the relative refractive index difference Δ, σ, and the transmission loss of the changed refractive index portion 10 in the first direction D1. As illustrated in FIG. 11, the smaller the value of σΔ and the value of σ, the smaller the transmission loss. When σ and σΔ satisfy the Formula 2, the transmission loss can be reduced to 0.1 (dB/cm) or less. The area of the graph illustrated in gray in FIG. 11 indicates the area that satisfies the above equation.

$$0.1\times\left((\sigma/0.13745)^2+(\sigma\Delta/0.00677)^2\right)<0.1[\text{dB/cm}] \quad \text{[Formula 2]}$$

The area that satisfies the above equation (the gray graph area in FIG. 11) can be allowed to be wider than the case when a correlation length Lc between σ and σΔ is shorter than 100 (μm). More preferably, the correlation length Lc is 10 (μm) or less. FIG. 11 illustrates a graph when the correlation length Lc is 10 (μm). As an example of a method for shortening the correlation length Lc, in the first process, the irradiation with the femtosecond laser beam L is performed at a plurality of spatial periods different from each other. That is, the irradiation with the femtosecond laser beam L is performed while changing the spatial period along the first direction D1. For example, while maintaining the repetition frequency f and the scanning speed v so that the irradiation interval in each pulse of the femtosecond laser beam L is 100 (nm) or less, the irradiation with the femtosecond laser beam L is performed while changing the spatial period by modulating at least one of f and v with a random number, so that the correlation length Lc can be allowed to be shorter than 100 (μm). The change in refractive index in the changed refractive index portion 10 has two or more different longitudinal periods. For example, by being irradiated with the femtosecond laser beam L as described above, the changed refractive index portion 10 has a structure where a longitudinal period of the refractive index is f1 and a longitudinal period f2 which is different from f1 and a plurality of periods are superimposed. For example, the changed refractive index portion 10 may have a structure in which f1 has a period of 30 (nm) and f2 has a period of 50 (nm). In addition, three or more periods may be superimposed, and in this case, the formation periods f1, f2, . . . , fn (n is a natural number of 3 or more) of the changed refractive index portion 10 can be selected so as not to be integral multiples of each other.

As described above, the repetition frequency of the femtosecond laser beam L in the second process is higher than 700 (kHz) and higher than the repetition frequency of the femtosecond laser beam L in the first process. As a result, the transmission loss of light in a communication wavelength band of 1310 (nm) can be reduced to 0.1 (dB/cm) or less. Furthermore, when the numerical aperture NA is 0.1 or more and 0.15 or less, single-mode operation can be performed in the communication wavelength band, and optical coupling with the general-purpose single-mode fiber can be obtained with low loss. Therefore, the low-loss optical component in which the optical waveguide 1 and the optical fiber are optically coupled can be obtained.

Figure 12:
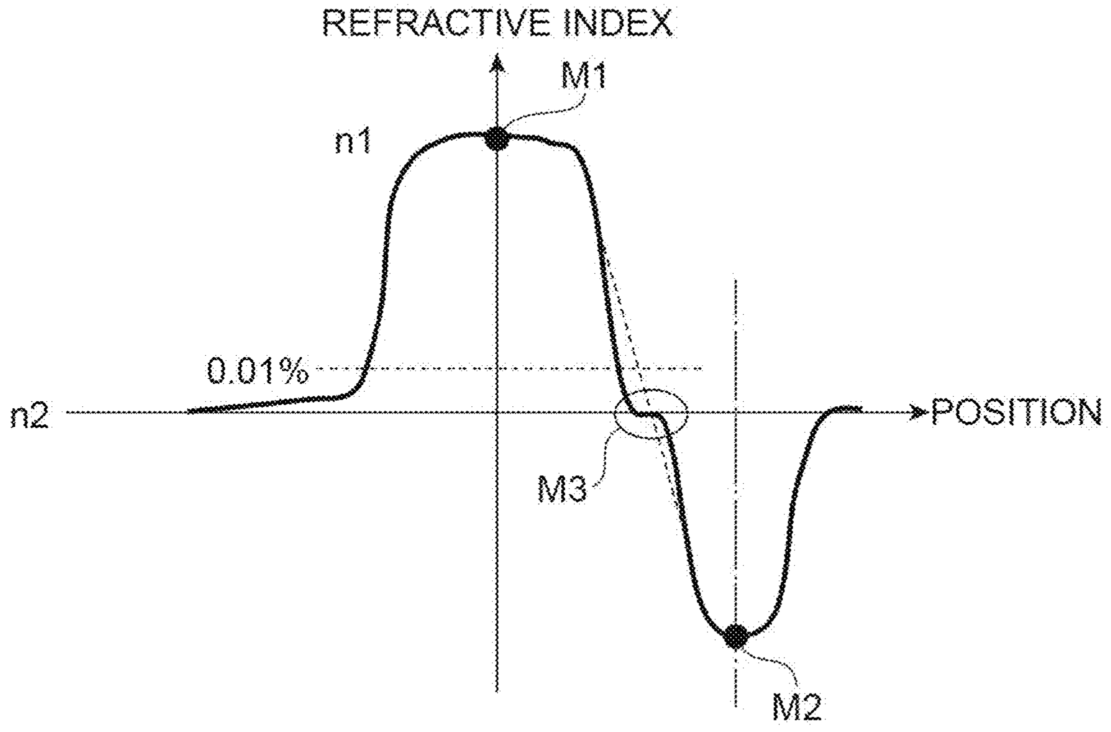
FIG. 12 is a graph illustrating a change in refractive index in a direction in which the increased refractive index portion, the decreased refractive index portion, and a front surface of the substrate are aligned.

FIG. 12 is a graph illustrating the relationship between the position in the third direction D3 in the increased refractive index portion 11 and the decreased refractive index portion 12 of FIG. 9 and the refractive index. The horizontal axis of the graph of FIG. 12 indicates the position in the direction (third direction D3) in which the increased refractive index portion 11, the decreased refractive index portion 12, and the front surface 2*d* of the substrate 2 are aligned, and the vertical axis of the graph of FIG. 12 indicates the refractive index. As illustrated in FIGS. 9 and 12, the refractive index decreases from the increased refractive index portion 11 toward the decreased refractive index portion 12 along the direction in which the increased refractive index portion 11, the decreased refractive index portion 12, and the front surface 2*d* are aligned. An inflection point M3 is formed between a highest point M1 of the refractive index in the increased refractive index portion 11 and a lowest point M2 of the refractive index in the decreased refractive index portion 12. It is noted that FIG. 12 illustrates an example in which three inflection points are formed. Since the refractive index inflection point M3 is formed between the increased refractive index portion 11 and the decreased refractive index portion 12, the fluctuation in refractive index can be smoothed.

Figure 13:
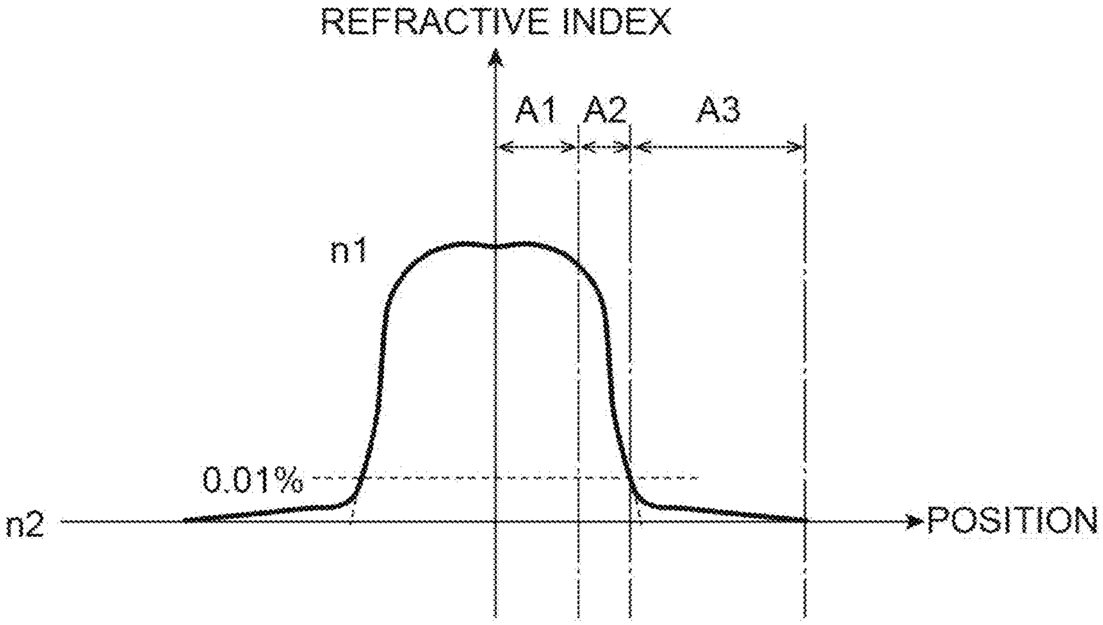
FIG. 13 is a graph illustrating the refractive indices in a first area including a center of the cross section of the increased refractive index portion in the plane perpendicular to the longitudinal direction, a second area located in the radial direction outside the first area, and a third area located in the radial direction outside the second area.

FIG. 13 is a graph illustrating the relationship between the position in the second direction D2 in the changed refractive index portion 10 (the plurality of increased refractive index portions 11 and the alleviation portions 15) of FIG. 4 and the refractive index. The horizontal axis of the graph of FIG. 13 indicates the position in the second direction D2, and the vertical axis of the graph of FIG. 13 indicates the refractive index. The changed refractive index portion 10 includes the first area A1 including the center of the cross section of the changed refractive index portion 10 in the plane perpendicular to the first direction D1, the second area A2 located radially outside the first area A1, and the third area A3 located radially outside the second area A2. When a relative refractive index difference of the changed refractive index portion 10 is Δ, the first area A1 is a light confining portion having Δ of 0.3(%) or more. The second area A2 is an inclined portion in which the amount of change (dΔ/dr) in the radial direction of the cross section of the changed refractive index portion 10 is 0.05 (%/μm) or more. The third area A3 is a diffusion portion in which A is larger than 0(%) and is 0.1(%) or less. For example, the diffusion portion corresponds to the alleviation portion 15. In this case, since the fluctuation in refractive index can be smoothed, the transmission loss of light can be reduced more reliably.

Heretofore, the embodiment has been described above. However, the present invention is not limited to the above-described embodiments, and various modifications are possible in the range of without changing the spirit of each claim. For example, in the above-described embodiment, the example in which the femtosecond laser beam L is applied once in the second process has been described. However, the number of times of irradiation with the femtosecond laser beam L in the second process may be the plurality of times, and is not particularly limited.

REFERENCE SIGNS LIST

1: optical waveguide, 2: substrate, 2*b*: first surface, 2*c*: second surface, 2*d*: front surface, 10: changed refractive index portion, 11: increased refractive index portion, 12: decreased refractive index portion, 15: alleviation portion.

The invention claimed is:

1. An optical waveguide manufacturing method for irradiating glass with a femtosecond laser to form the optical waveguide, the method comprising:

irradiating the glass with a first femtosecond laser beam at a pulse width of 300 fs or less and a repetition frequency of 700 kHz or less while relatively moving the glass and a focal position of the first femtosecond laser beam;

causing an increased refractive index portion by the irradiation of the glass with the first femtosecond laser beam; and alleviating the increased refractive index portion by irradiating the increased refractive index portion with a second femtosecond laser beam at a pulse width of 300 fs or less and a repetition frequency higher than 700 kHz, wherein a sum σ of a standard deviation σR in a longitudinal direction, which is the direction in which the increased refractive index portion of $(S/\pi)^{1/2}$ is extended in a substrate and a standard deviation σG in the longitudinal direction of barycentric coordinates G(D2, D1) as shown in Formula 1 satisfies σ≤0.12 μm

[Formula 1]

$$G = \left( \frac{\sum_{i=1}^{n} \sum_{j=1}^{m} (D2ij \cdot \Delta_{D2ij})}{\sum_{i=1}^{n} \sum_{j=1}^{m} (\Delta_{D2ij})}, \frac{\sum_{i=1}^{n} \sum_{j=1}^{m} (D1ij \cdot \Delta_{D1ij})}{\sum_{i=1}^{n} \sum_{j=1}^{m} (\Delta_{D1ij})} \right) \quad (1)$$

2. The method for manufacturing the optical waveguide according to claim 1, wherein pulse peak energy E1 of the first femtosecond laser beam and pulse peak energy E2 of the second femtosecond laser beam satisfies E1>E2 and E2>(E1/100).

3. The method for manufacturing the optical waveguide according to claim 1, wherein a distance from an incident position to the focal position of the second femtosecond laser beam on the glass is larger than a distance from the incident position to the focal position of the first femtosecond laser beam on the glass.

4. The method for manufacturing the optical waveguide according to claim 1, wherein the glass is irradiated with the first femtosecond laser beam at a plurality of spatial periods different from each other to form the increased refractive index portion.

5. An optical waveguide manufacturing method for irradiating glass with a femtosecond laser to form the optical waveguide, the method comprising:

irradiating the glass with a first femtosecond laser beam at a pulse width of 300 fs or less and a repetition frequency of 700 kHz or less while relatively moving the glass and a focal position of the first femtosecond laser beam;

causing an increased refractive index portion by the irradiation of the glass with the first femtosecond laser beam; and alleviating the increased refractive index portion by irradiating the increased refractive index portion with a second femtosecond laser beam at a pulse width of 300 fs or less and a repetition frequency higher than 700 kHz, wherein a sum σ of a standard deviation σR in a longitudinal direction, the longitudinal direction is a direction in which a changed refractive index portion of $(S/\pi)^{1/2}$ is extended in a substrate and a standard deviation OG in the longitudinal direction of barycentric coordinates G(D2, D1) as shown in Formula 1 and a standard deviation σΔ in the longitudinal direction of an average value Δ in a cross section perpendicular to the longitudinal direction of a relative refractive index difference of a waveguide portion satisfies Formula 2

[Formula 1]

$$G = \left( \frac{\sum_{i=1}^{n} \sum_{j=1}^{m} (D2ij \cdot \Delta_{D2ij})}{\sum_{i=1}^{n} \sum_{j=1}^{m} (\Delta_{D2ij})}, \frac{\sum_{i=1}^{n} \sum_{j=1}^{m} (D1ij \cdot \Delta_{D1ij})}{\sum_{i=1}^{n} \sum_{j=1}^{m} (\Delta_{D1ij})} \right) \quad (1)$$

$$0.1 \times \left( (\sigma/0.13745)^2 + (\sigma\Delta/0.00677)^2 \right) < 0.1 [\text{dB/cm}]. \quad \text{[Formula 2]}$$

* * * * *